United States Patent [19]

Butts et al.

[11] Patent No.: US 6,205,417 B1
[45] Date of Patent: *Mar. 20, 2001

[54] SERVER AND TERMINAL EMULATOR FOR PERSISTENT CONNECTION TO A LEGACY HOST SYSTEM WITH DIRECT AS/400 HOST INTERFACE

[75] Inventors: Thomas H. Butts, Wills Point; Stuart H. Burris, Jr., Garland; Randy E. Mays, Rockwall, all of TX (US)

[73] Assignee: Openconnect Systems Incorporated, Dallas, TX (US)

[*] Notice: Subject to any disclaimer, the term of this patent is extended or adjusted under 35 U.S.C. 154(b) by 0 days.

This patent is subject to a terminal disclaimer.

[21] Appl. No.: 09/299,866

[22] Filed: Apr. 27, 1999

Related U.S. Application Data

[63] Continuation-in-part of application No. 09/069,522, filed on Apr. 29, 1998, which is a continuation of application No. 08/625,109, filed on Apr. 1, 1996, now Pat. No. 5,754,830.

[51] Int. Cl.[7] .................................................. G06F 9/455

[52] U.S. Cl. ........................... 703/27; 709/311; 710/105; 370/466; 370/469

[58] Field of Search ................................. 703/27, 26, 23; 709/246, 218, 206, 203, 227, 228, 313, 311; 705/9; 707/1; 370/466, 469; 710/105

[56] References Cited

U.S. PATENT DOCUMENTS 5,228,137 * 7/1993 Kleinerman ............................. 703/26
5,475,836 * 12/1995 Harris et al. .......................... 709/206
5,485,369 * 1/1996 Nicholls et al. .......................... 705/9

(List continued on next page.)

OTHER PUBLICATIONS

"Mobile Telescript Agents and the Web", by P. Domel, COMPCON '96 IEEE Computer Society International, 1996, pp. 52–57.*
"Java Security: From HotJava to Netscape and Beyond", by Dean, et al., Security and Privacy 1996 IEEE Symposium, Feb. 1996, pp. 190–200.*
"Mobile Intelligent Agent Systems: Wave vs. Java", by Vuong, et al., Emerging Technologies and Applications in Communication, 1996 IEEE Conference, Mar. 1996, pp. 196–199.*
"Java and the Shift to Net–Centric Computing", by M. Hamilton, IEEE Computer Magazine, Aug. 1996, pp. 31–39.*

(List continued on next page.)

*Primary Examiner*—Kevin J. Teska
*Assistant Examiner*—Russell W. Frejd
(74) *Attorney, Agent, or Firm*—Baker Botts L.L.P.

[57] ABSTRACT

A computer network environment (10) allowing connection of a client system (36) to a legacy host system (18,19) using a server (26) is provided. The computer network environment (10) includes a legacy host system (18,19) having TCP/IP connectivity. The legacy host system (18,19) is operable to support a terminal session for access to the legacy host system (18,19). The computer network environment (10) also includes a server (26) operable to communicate with the legacy host system (18,19) across a persistent TCP/IP socket connection (30). The computer network environment (10) further includes a client system (36) executing an applet process (42) under a web browser (38). The applet process (42) is operable to communicate with the client thread (28) across another persistent TCP/IP socket connection (44) and is operable to provide a terminal session to a user of the client system (36). This terminal session is supported by a persistent connection allowing real-time bidirectional communication with the legacy host system (18,19), including a direct interface to an AS/400 host.

24 Claims, 3 Drawing Sheets

U.S. PATENT DOCUMENTS

| | | | | |
|---|---|---|---|---|
| 5,497,463 | * | 3/1996 | Stein et al. | 709/203 |
| 5,530,852 | * | 6/1996 | Meske, Jr. et al. | 709/206 |
| 5,568,612 | * | 10/1996 | Barrett et al. | 709/203 |
| 5,600,833 | * | 2/1997 | Senn et al. | 707/1 |
| 5,617,540 | * | 4/1997 | Civanlar et al. | 709/227 |
| 5,619,650 | * | 4/1997 | Bach et al. | 709/246 |
| 5,634,006 | * | 5/1997 | Baugher et al. | 709/228 |
| 5,634,127 | * | 5/1997 | Cloud et al. | 709/313 |
| 5,636,371 | * | 6/1997 | Yu | 703/26 |
| 5,754,830 | * | 5/1998 | Butts et al. | 709/311 |

OTHER PUBLICATIONS

"Java, the Web, and Software Development", by E. Yourdon, IEEE Computer Magazine, Aug. 1996, pp. 25–30.*

"Interoperable Object Models for Large Scale Distributed Systems", by Newell, et al., IEE Colloq. No. 184: Client/Server Computing Seminer Proceedings, 1995, pp. 14/1–14/6.*

Hot Java Applet Programming Contest–Winners, third prize "Terminal Emulator", <http://www.javasoft.com/contest/winners.html and <http://www.javasoft.com/contest/authors.html.

TN3270 Java Terminal Emulator and Libraries, <http://www.unige.ch/hotjava/HotSIBIL.html and <http://www.unige.ch/hotjava/TN3270.html.

Curt Lang, Jeff Chow, "Database Publishing on the Web & Intranets", (Coroilis Group Books, 1996), pp. i–ii (title pages), vii–xiii (table of contents), 20–21, 40–45, 293, 334, 400, 425–427, 443, 474, 499–510 (index).

"Multiple Service Integration Confronted with Legacy Systems," by Louis Perrochon, Contribution to the Workshop Offering the same information via multiple services of the First International Conference on the World–Wide Web, Geneva, May 1994.

"Translation Servers: Gateways Between Stateless and Stateful Information Systems," by Louis Perrochon, located on the World–Wide Web,1994.

"IDLE: Unified W3–Access to Interactive Information Servers," by Louis Perrochon, Roman Fischer, Computer Networks and ISDN Systems 27 (1995), pp. 927–938.

Amitabh Dave, Mohlalefi Sefika and Roy H. Campbell, "Proxies, Application Interfaces, and Distributed Systems," Proc. 2nd Intl. on Conf. on Object Orientation in Operating Systems,, Sep. 24–25, 1992, Dourdan, France.

Venkata N. Padmanabhan, Jeffrey C. Mogul, "Improving HTTP Latency," Computer Networks and ISDN Systems 28 (1995), pp. 25–35.

Jeffrey C. Mogul, "The Case for Persistent–Connection HTTP," Proc. of ACM SIGCOMM'95 Conference on Application, Technologies, Architectures, and Protocols for Computer Communication, Aug. 28 to Sep. 1, 1995, Cambridge, Massachusetts.

* cited by examiner-

SERVER AND TERMINAL EMULATOR FOR PERSISTENT CONNECTION TO A LEGACY HOST SYSTEM WITH DIRECT AS/400 HOST INTERFACE

RELATED APPLICATIONS

This application is a continuation-in-part application of application Ser. No. 09/069,522 filed Apr. 29, 1998, entitled, Server and Web Browser Terminal Emulator for Persistent Connection to a Legacy Host System and Method of Operation, which is a continuation application of application Ser. No. 08/625,109, filed Apr. 1, 1996 by Thomas H. Butts, et al. entitled, Server and Web Browser Terminal Emulator for Persistent Connection to a Legacy Host System and Method of Operation, now issued as U.S. Pat. No. 5,754,830.

TECHNICAL FIELD OF THE INVENTION

This invention relates in general to the field of electronic systems, and more particularly to a server and a web browser terminal emulator for persistent connection. to a legacy host system and a method of operation.

BACKGROUND OF THE INVENTION

Many organizations operate computer network environments that include legacy host systems which store data and provide applications important to the operation of the organization. Such legacy host systems can include IBM mainframes (MVS, VM and VSE environments), IBM AS/400 systems and UNIX host systems.

It is desirable for such organizations to provide connection to the legacy host systems through terminal sessions on distributed client systems such as personal computers and computer workstations. This connection to the legacy host system provides access for users of the client systems to the data and applications on the legacy host system. These terminal sessions can include 3270, 5250, NVT and VT220 type terminal sessions.

One conventional method for providing terminal sessions is to execute a terminal emulator application on the client systems that connects directly to a host legacy system using a TCP/IP socket connection. Another conventional method is to provide connection through a web browser application by translating standard legacy data flows into HTML pages. However, such conventional web browser methods suffer from an inability to handle real-time host updates to user screens as well as other significant problems. For example, forms-based HTML/TN3270 packages are unable to overcome a range of problems associated with common HTML implementations such as real-time host updates to user screens or finding a user's browser platform address on the network.

SUMMARY OF THE INVENTION

One aspect of the invention is a computer-implemented terminal session emulator for providing browser-based access to legacy host applications. An emulation server is in communication with a web server, by being built into an existing web server or otherwise. The emulation server negotiates a persistent connection between a legacy host system and a client system. Applet code is operable to create an applet process executing under a web browser on a client system. This applet code is downloadable from the web server to the client system in response to receiving a uniform resource locator associated with the legacy host system. When executed by the client system, the applet process is operable to communicate with the emulation server to provide a terminal session to a user of the client system via the persistent connection. The emulator server resides at the host system, and has a virtual terminal handler that communicates with a virtual terminal applications program interface of the host.

An advantage of the invention is that it permits direct access to AS/400 host systems, without the need for a TN server. The emulation server is located at the host, and uses the virtual terminal interface of the host. This "two-tiered" architecture is simpler and easier to maintain and support as compared to "three-tiered" architectures that use an emulation server at a separate server location. Data can be shared between the host and web-browser clients using secure end-to-end connections. The persistent connection supports concurrent sessions, real-Time host updates, asynchronous messaging, and session monitoring.

DETAILED DESCRIPTION OF THE INVENTION

System Overview

Figure 1:
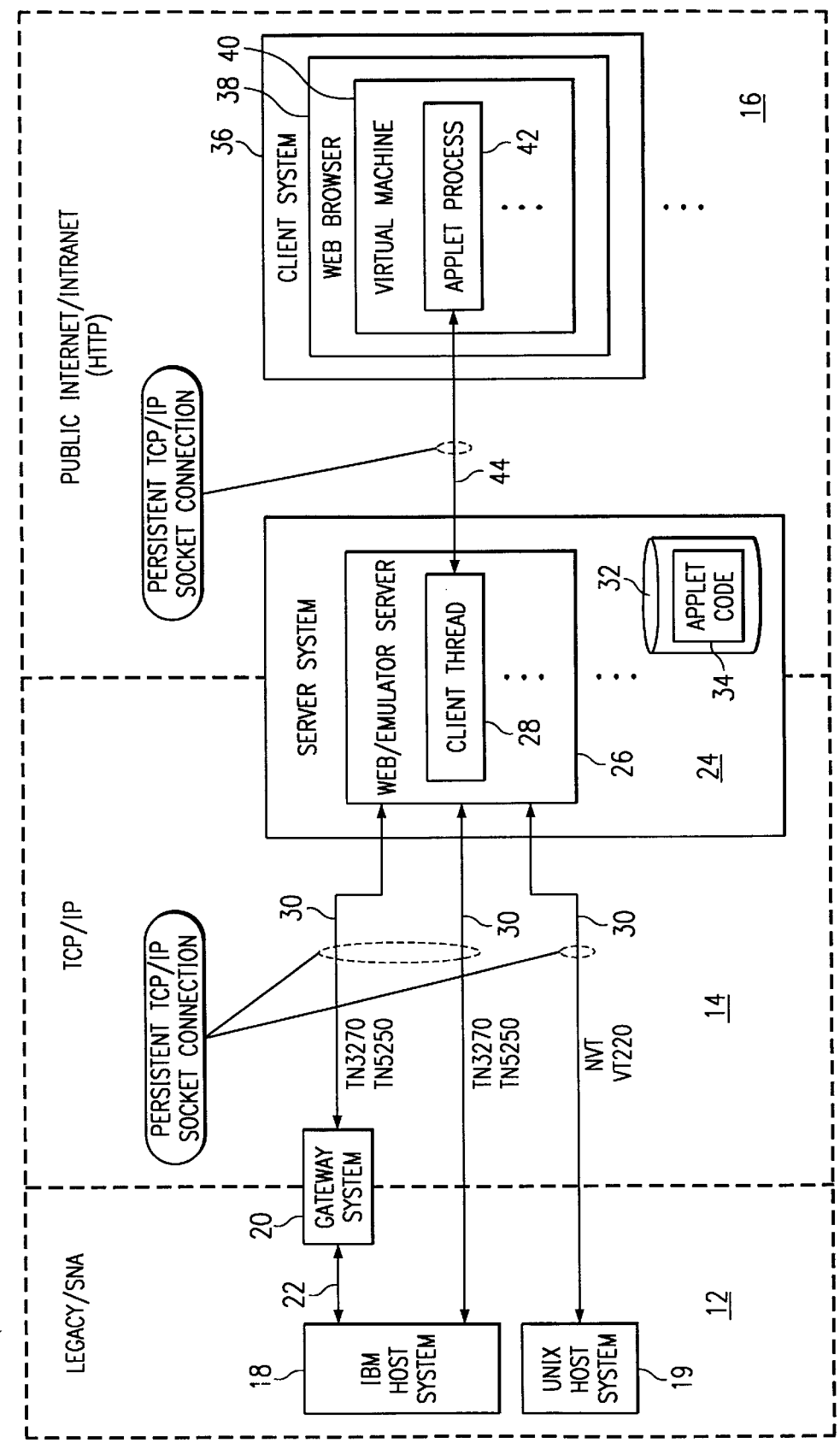
FIG. 1 is a block diagram of a computer network environment that allows connection of a client system to a legacy host system using a web/emulator server according to the teachings of the present invention.

FIG. 1 is a block diagram of a computer network environment, indicated generally at 10. Network environment 10 includes a legacy/SNA environment 12, a TCP/IP environment 14 and a public Internet/intranet environment 16.

Legacy/SNA environment 12 includes one or more legacy host systems such as an IBM host system 18 and a UNIX host system 19. IBM host system 18 can comprise an IBM mainframe (MVS, VM and VSE environment) or an IBM AS/400 system. UNIX host system 19 can comprise a computer workstation or server running a UNIX-type environment.

A gateway system 20 can be coupled to IBM host system 18 via a connection 22. Connection 22 can comprise an SNA or channel attachment to IBM host system 18. Gateway system 20 provides an interface between legacy/SNA environment 12 and TCP/IP environment 14. Gateway system 20 can be integral with IBM host system 18 or can be a separate, add-on system extending the functionality of IBM host system 18. For example, gateway system 20 can comprise an OC SERVER II™ gateway product available from OPENCONNECT SYSTEMS. UNIX host systems 19 and some IBM host systems 18 have built in TCP/IP connectivity such that the use of a gateway system 20 is unnecessary.

TCP/IP environment 14 includes a server system 24. Server system 24 executes one or more web/emulator servers 26. Web/emulation server 26 provides an interface between TCP/IP environment 14 and public Internet/intranet environment 16 and is operable to execute one or more client threads 28. Web/emulator server 26 is operable to connect to gateway system 20, to IBM host system 18 and to UNIX host system 19 via a persistent TCP/IP socket connection 30. Server system 24 includes a data storage device 32 that stores applet code 34. Applet code 34 comprises executable code for an applet process. Web/emulation server 26 can comprise an OC://WEBCONNECT™ server available from OPENCONNECT SYSTEMS, and applet code 34 can comprise a JAVA applet for use within SUN MICROSYSTEM's JAVA environment.

Public Internet/intranet environment 16 includes one or more client systems 36. Client system 36 can comprise a desk top computer such as a personal computer or computer workstation. Client system 36 is operable to execute a web browser 38. Web browser 38 is operable to establish a virtual machine 40 for executing an applet process 42. Applet process 42 comprises an instance of applet code 34 downloaded to client system 36 by web/emulator server 26. Applet process 42 is connected to client thread 28 via a persistent TCP/IP socket connection 44. Web browser 38 can comprise a commercially available web browser application such as NETSCAPE NAVIGATOR that is JAVA-capable and applet process 42 can comprise a JAVA applet.

In operation, web/emulator server 26, client thread 28 and applet process 42 form a web browser terminal emulator providing a persistent bidirectional connection between client system 36 and a legacy host system such as IBM host system 18 or UNIX host system 19. Applet process 42 communicates with client thread 28 across persistent TCP/IP socket connection 44. Client thread 28 communicates with an appropriate legacy host system, either IBM host system 18 or UNIX host system 19, across a persistent TCP/IP socket connection 30. Client thread 28 and applet process 42 allow a user of client system 36 to use web browser 38 to invoke a terminal session for accessing data and applications on a legacy host system. Each web/emulation server 26 is operable to manage a plurality of client threads 28 associated with a plurality of applet processes 42. In one embodiment of the present invention, each web/emulation server 26 is operable to manage a thousand such connections.

Client thread 28 executes under web/emulator server 26 and is operable to communicate with a legacy host system across a persistent TCP/IP socket connection 30. Client 5thread 28 is operable to interface between TCP/IP environment 14 and public Internet/intranet environment 16. Applet process 42 executes under web browser 38 and is operable to communicate with client thread 28 across persistent TCP/IP socket connection 44. In one embodiment of the present invention, client thread 28 and applet process 42 using a web/emulator data flow. Applet process 42 is further operable to provide a terminal session to a user of the client system 36. The terminal session can comprise a 3270, 5250, NVT or VT220 type terminal session. This terminal session provided by applet process 42 and client thread 28 is supported by a persistent TCP/IP socket connection which allows real-time bidirectional communication with the legacy host system.

In one embodiment of the present invention, the applet process uses three threads to implement the terminal session. The applet process uses a READ thread, a WRITE thread and an EMULATION thread. The READ thread provides a buffer interface to persistent TCP/IP socket connection 44 and reads information from the socket. The WRITE thread provides a buffer interface to persistent TCP/IP socket connection 44 and writes to the socket. The EMULATION thread provides the user interface representing the terminal session on the legacy host system. In this embodiment, the applet process and the client thread communicate using a web/emulator data flow based upon the communication protocol that is set forth in APPENDIX A.

According to the present invention, a user of client system 36 can access data and applications on the legacy host system using web browser 38 where the access is provided through a persistent bidirectional connection to the legacy host system. Persistent TCP/IP socket connections 30 and 44 provide this persistent bidirectional connection to IBM host system 18 or UNIX host system 19 such that real-time host updates, security, encryption, help-desk support, and other real-time features are supported. One embodiment of the present invention uses SUN MICROSYSTEMS' JAVA technology and includes JAVA-capable web browsers 38 and embedded JAVA applet processes 42 to provide terminal session connectivity to client systems 36.

The present invention provides connectivity to legacy host systems such as IBM host system 18 and UNIX host system 19 through web browser 38 without the need for specialized emulation software to be manually loaded on each client system 36 and without the need for user programming. Web/emulator server 26 downloads applet code 34 to client system 36 when the uniform resource locator (UR.) of the legacy host system is selected by the user. This is accomplished automatically without requiring service personnel to load software on client system 36.

The present invention also allows the expansion of access to existing data and applications on legacy host systems from existing client systems 36 using existing network capabilities. The present invention provides a network environment 10 that allows the use of a public Internet/intranet environment 16 having web browser tools, such as JAVA tools, and web-serving to incorporate Internet-type technologies, through the Internet or an intranet, with existing network architectures. Thus, an organization can implement web browser 38 based access to legacy host systems, such as IBM host systems 18 and UNIX host systems 19, without scrapping or significantly restructuring existing network resources.

Figure 2:
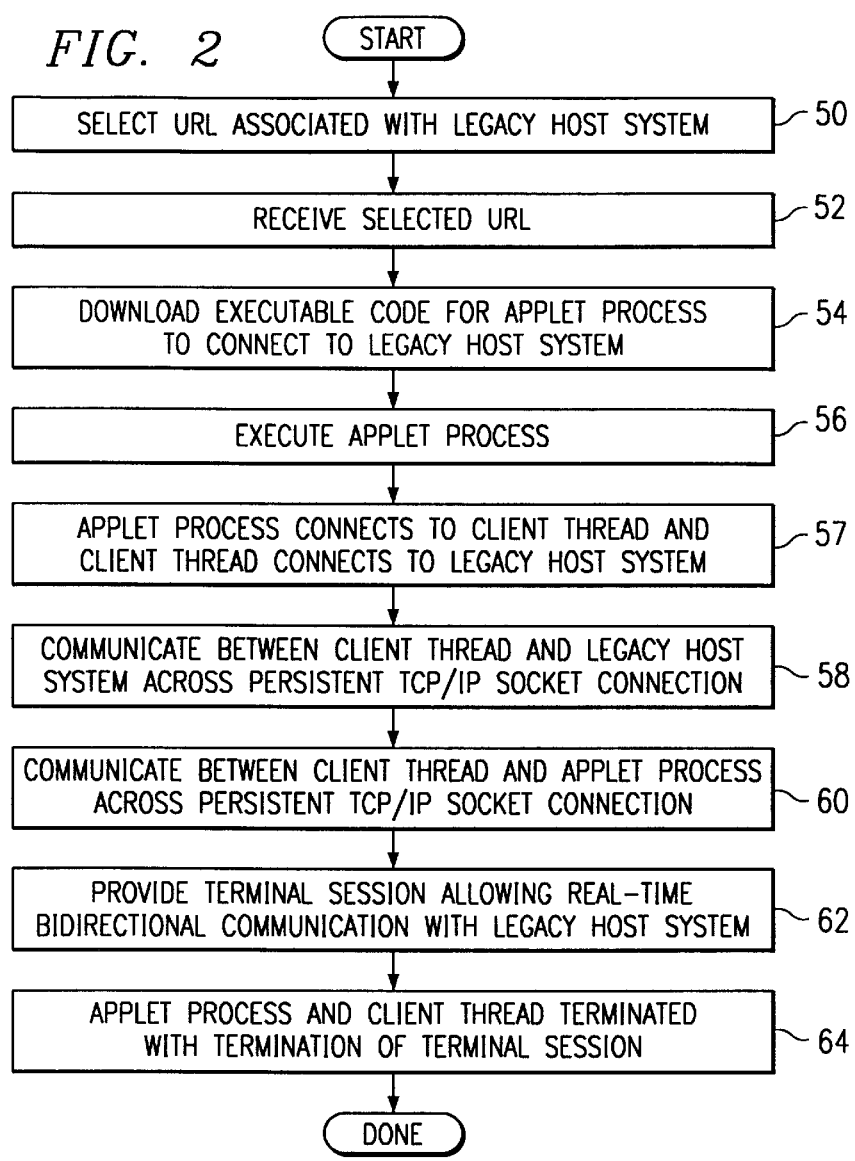
FIG. 2 is a flow chart of a method for connecting a client system to a legacy host system using a web/emulator server according to the teachings of the present invention.

FIG. 2 is a flow chart of a method for connecting a client system to a legacy host system using a web/emulator server according to the teachings of the present invention.

In step 50, a uniform resource locator (UR.) associated with a legacy host system is selected from a web browser executing on a client system. The web browser can comprise a JAVA-capable NETSCAPE NAVIGATOR web browser as mentioned above. The selected uniform resource locator is received by a web/emulator server in step 52. In step 54, the web/emulator server downloads executable code for an applet process to the client system for connecting to the legacy host system. In step 56, the client system executes the applet process under the web browser. The applet process can comprise a JAVA applet for execution within a JAVA virtual machine within the NETSCAPE NAVIGATOR web browser.

In step 57, the applet process connects to a client thread executed by the web/emulator server, and the client thread connects to the legacy host system across persistent TCP/IP socket connections. In step 58, the client thread then communicates with the legacy host system across the persistent TCP/IP socket connection. This communication allows the client thread to establish and maintain a terminal connection to the legacy host system. In step 60, the client thread communicates with the applet process across a persistent TCP/IP socket connection. This communication can be accomplished using a web/emulator data flow such as that based upon the communication protocol set forth in APPENDIX A.

In step 62, the applet process provides a terminal session to a user of the client system. According to the present invention, this terminal session allows real-time bidirectional communication with the legacy host system across a persistent TCP/IP socket connection to the legacy host system. This terminal session, as mentioned above, can comprise a 3270, 5250, NVT or VT220 type terminal session.

The terminal session can be terminated by the user of the client system as desired. The applet process and client thread are terminated, in step 64, when the terminal session is terminated. In one embodiment, after termination, the applet process is removed from execution memory and is no longer present on the client system. In another embodiment, the executable code for the applet can be stored on a data storage device associated with the client system. In this embodiment, the web/emulation server can check the client system to determine whether new executable code for the applet needs to be downloaded based upon the version present, if any, on the data storage device of the client system.

The present invention provides an interface to legacy data flows, such as telnet (TN) data flows, across persistent TCP/IP socket connections to give users persistent bidirectional access to legacy host system data in terminal sessions, such as 3270, 5250, NVT and VT220 type terminal sessions. According to the present invention, terminal emulation is partially provided by applet executable code downloaded from the web/emulation server. The user can select the uniform resource locator (UR.) of the legacy host system via a web browser package, such as NETSCAPE's NETSCAPE NAVIGATOR, and transparently receive the applet code which is executed and invokes an appropriate terminal session.

The present invention provides users of the client system access to real-time legacy host system data and applications using a web browser. The web/emulator server system converts standard legacy data flows into web/emulator data flows and vice versa permitting multi-session, multi-protocol access to legacy data and applications. The applet process converts the web/emulator data flows into a terminal session for display to the user. As mentioned above, the web browser can comprise a JAVA-capable web browser, the applet process can be a JAVA applet, and the web/emulator data flow can be based upon the protocol set forth in Appendix A. This embodiment of the present invention can blend web browsers enhanced by SUN MICROSYSTEMS' JAVA with legacy host systems having TCP/IP connectivity to allow users on any client system platform to connect to and access legacy host systems via 3270, 5250, NVT and VT220 type terminal emulation.

Figure 3:
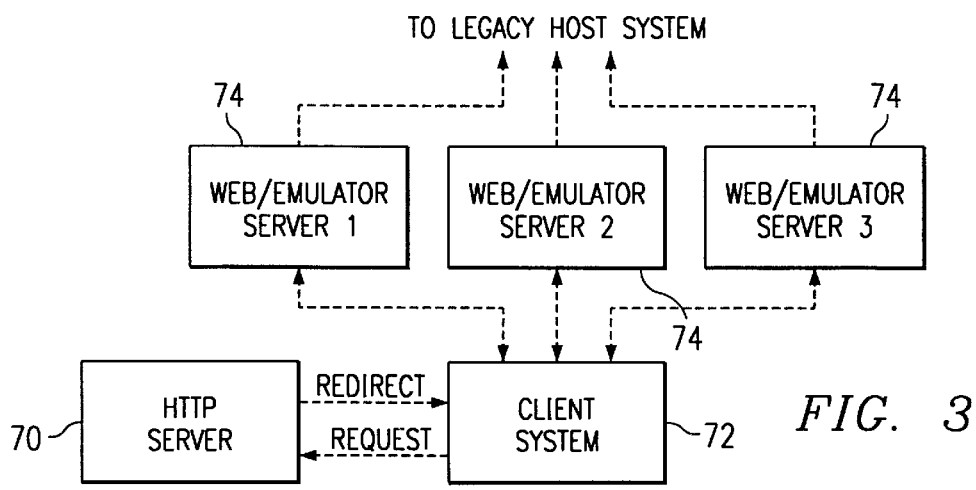
FIG. 3 is a block diagram of load-balancing across multiple web/emulator servers according to the teachings of the present invention.

FIG. 3 is a block diagram of load-balancing across multiple web/emulator servers according to the teachings of the present invention. An HTTP server 70 is coupled to a client system 72. HTTP server 70 receives request information, REQUEST, from client system 72 in the form of a uniform resource locator (UR.) and provides redirection information, REDIRECT, to client system 72. Client system 72 is then coupled to one of a plurality of web/emulation servers 74 according to the redirection information. In this manner HTTP server 70 can redirect access by a plurality of client systems 72 to manage the load on web/emulation servers 74 to ensure a balance across all available web/emulation servers 74.

This load-balancing can remain transparent to a user of client system 72. The user enters the uniform resource locator associated with the legacy host system. That information is transmitted to HTTP server 70 as a request. HTTP server 70 interprets the request, identifies the selected legacy host system, and selects a web/emulation server 74 to manage the connection. This selection of a web/emulation server 74 can be based upon information of the current loading of each web/emulation server 74. HTTP server 70 transparently provides redirect information to client system 72 which identifies the uniform resource locator of the selected web/emulation server 74. Client system 72 then initiates the above described terminal session through the selected web/emulation server 74 and the selected web/emulation server 74 connects to the legacy host system as described above.

The present invention provides web browser connectivity with relatively low initial and recurring cost. The need for individual emulation software products based upon each particular client system is removed. This eliminates many technical support, help desk and software distribution problems, including version level control and configuration management issues. Extensive user training is no longer necessary because web browsers generally offer intuitive common user interfaces and are known by many users. Implementation time is improved by taking advantage of an existing widely-installed web browser base. Specifically, the platform independence provided by the JAVA architecture allows the web browser terminal emulator of the present invention to avoid problems with operation differences between computer environments. In addition, numerous users can be supported concurrently by each web/emulation server. For example, the OC://WEBCONNEC™ product from OPENCONNECT SYSTEMS can support a thousand users per instance.

The present invention provides connectivity from any client system, such as a personal computer or computer workstation, to a legacy host system, such as a mainframe or mid-range system, without costly redesign or rebuilding of legacy applications. The benefits of a distributed client/server type data exchange can be realized without requiring systems redesign. This approach means that the many advantages of Internet-type access and functionality can be blended into an organization's network architecture simply and efficiently, thus protecting existing information technology infrastructures and investments.

Direct Host/Server Interface for AS/400 Host

Referring again to FIG. 1, as explained above, the invention is used within a "browser-based SNA-capable" communications network, where a server 26 downloads an applet process 42 to a client system 36 in response to a UR. call from client system 36 to host system 10. Host system 10 (with or without the aid of a separate gateway) provides a SNA-type data flow. The applet process 42 generates the terminal emulation session at client system 36. Various embodiments of the system of FIG. 1 use different SNA data to provide different terminal sessions,.

The connection between host system 18 and client system 36 is a persistent connection. Various embodiments of the invention negotiate and maintain the persistent connection using different configurations. For example, the network may or may not include a TN server (gateway 20) or a built-in TN interface at host system 18. Also, although FIG. 1 illustrates server 26 as having both web server and emulation server functions implemented on the same computer, they may be implemented on separate computers. Furthermore, the emulation server functions may be implemented on host system 18, with or without a separate web server. Regardless of the specific configuration, common characteristics of the invention are the downloading of an applet process 42 to the client system and the negotiation of a persistent connection between legacy system 18 and client system 36.

The terminal session data flow is established in accordance with a protocol associated with the applet process 42, that is, a protocol that permits applet process 42 to communicate with host system 18. This communication may be via a emulation programming at server 26, which performs tasks such as encryption. In the example of this description, applet process 42 is a Java applet and the protocol is consistent with the Java language. However, the invention may be implemented with appletts in other languages, with a common characteristic being that the applet is downloaded to provide client-executable code and has an associated protocol that permits it to communicate with server 26.

Figure 4:
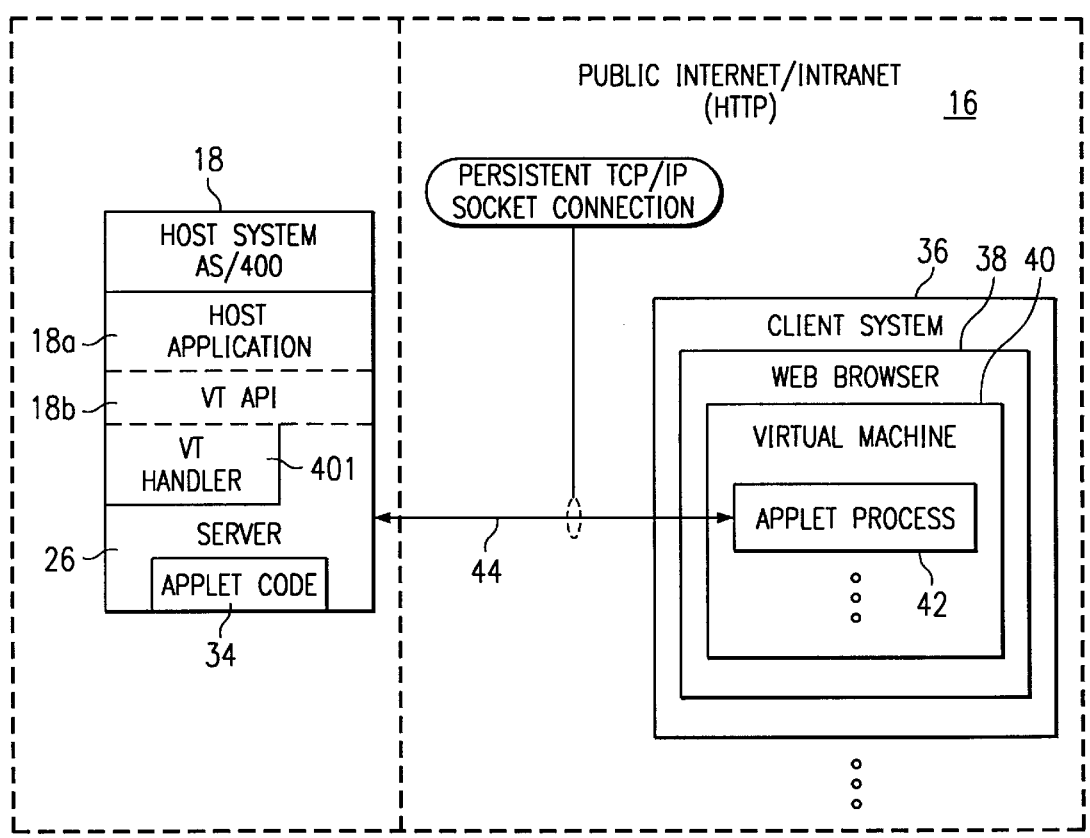
FIG. 4 illustrates an alternative to the embodiment of FIG. 1, providing a direct interface to an AS/400 host system.

FIG. 4 illustrates a "direct connect" configuration, used where host system 18 is of the "minicomputer" type having a "virtual terminal" interface. For example, host system 18 might be an AS/400 IBM minicomputer. As illustrated, in the embodiment of FIG. 4, server 26 resides on host system 18, using a port of host system 18. Server 26 is used to establish the same TCP/IP persistent connection between it and client system 36 as described above, with server 26 downloading applet code 34 to be executed as an applet process 42 by client system 36.

For the direct AS/400 connection of FIG. 4, the TN link is eliminated. Server 26 communicates with host application 18a directly through a virtual terminal (VT) applications program interface (API) 18b. There is no intermediate path through a TN protocol stack at a gateway 20 or through a built-in TN gateway. VT interface 18b is a widely known and used communications interface of IBM AS/400 systems.

A VT handler 401 is provided on server 26 for this purpose. VT handler 401 performs protocol conversions between the protocols associated with host application 18a and web server 26. It may be implemented with programming written in conformance with published IBM standards, where server 26 acts as the "virtual terminal server" for which the VT interface was designed.

The VT handler 401 permits the emulation server 26 to interact with AS/400 application programs. The handler 26 handles input and output tasks required for the exchange of data between the applications programming 18a and the emulation server 26.

The architecture of FIG. 4 may be referred to as a "two-tiered" architecture. There is no need for a separate web server or emulation server; these functions reside on host system 18.

The embodiment of FIG. 4 provides 5250 terminal sessions. Various device types supported by the AS/400 are also supported by web server 26, such as 3477, 5251, 3196, 3179, and 5555 emulation.

Other than the "backend" interface to host system 18, server 26 is the same as described above for a three-tiered system. It downloads the applet process 42 and establishes a TCP/IP persistent connection between host system 18 and client system 36, using a special protocol to communicate with the applet process 42. Server 26 may have its emulation server and web server functions implemented on different computers in communication with each other.

An advantage of the direct connection of FIG. 4 is that it permits encryption from end to end. For example, public-key encryption techniques, such as those using the RSA or DES algorithms, can be implemented by server 26. Security may be provided at application, transport, session, and host levels.

Other Embodiments

Although the present invention has been described in detail, it should be understood that various changes, substitutions and alterations can be made hereto without departing from the spirit and scope of the invention as defined by the appended claims.

What is claimed is:

1. A computer-implemented terminal session emulator for providing browser-based access to minicomputer legacy host applications, comprising:

an emulation server operable to negotiate a persistent connection between a legacy host system and a client system, said emulation server further in communication with a web server; and applet code operable to create an applet process executing under a web browser on a client system, said applet code being downloadable from the web server to the client system in response to receiving a uniform resource locator associated with the legacy host system, and, when executed by the client system, the applet process operable to communicate with said emulation server to provide a terminal session to a user of the client system via said persistent connection; and a virtual terminal handler for handling communications between said emulation server and a virtual terminal application program interface of said legacy host system.

2. The emulator of claim 1, wherein the persistent connection is established by means of a protocol that handles communications between said applet process and said emulation server.

3. The emulator of claim 1, wherein said emulation server is further operable to perform bi-directional protocol conversions between the legacy host data stream and a web browser data stream.

4. The emulator of claim 1, further comprising said web server.

5. The emulator of claim 1, wherein said legacy system is an AS/400 system.

6. The emulator of claim 1, wherein the applet code comprises executable code for a JAVA applet to be executed under a JAVA-capable web browser.

7. The emulator of claim 1, wherein the persistent connection is a persistent TCP/IP connection.

8. The emulator of claim 1, further comprising a client thread at said emulation server operable to provide both upstream and downstream communications.

9. The emulator of claim 1, wherein the emulation server is operable to communicate using a 5250 data flow and the applet process is operable to provide a 5250 type terminal session.

10. A computer-readable medium whose contents are an emulation server process that causes a client system to provide a terminal emulation session in direct connection to a minicomputer host legacy system, the client computer system having a web browser program, by performing the steps of:

establishing a persistent connection to said client system, using a communications protocol associated with an applet process executing on said client system and compatible with said web browser; and communicating with said legacy host system through a virtual terminal handler in communication with a virtual terminal application program interface of said legacy host system, such that a datastream representing a persistent terminal emulation session is provided at said client system.

11. The medium of claim 10, wherein said persistent connection is via an emulation server in communication with said web server, such that said applet process communicates with said emulation server by means of said protocol.

12. The medium of claim 10, wherein the applet process comprises a JAVA applet executing under a JAVA-capable web browser.

13. The medium of claim 10, wherein the persistent connection is a persistent TCP/IP connection.

14. The medium of claim 10, wherein the applet process is operable to provide a 5250 type terminal session.

15. The medium of claim 10, wherein said legacy host system is an AS/400 system.

16. The medium of claim 10, further comprising the step of encrypting said datastream at said host system before said data stream is communicated to said client system.

17. A method for connecting a client system to a minicomputer legacy host system for terminal emulation, comprising:

executing an applet process under a web browser on the client system in response to selection of a uniform resource locator associated with a legacy host system;

connecting the applet process to the legacy host system across a persistent connection;

communicating between the applet process and the legacy host system across the persistent connection; and providing a terminal session to a user of the client system by the applet process, such that the terminal session is supported by the persistent connection allowing communication with the legacy host system directly to a virtual terminal applications program interface of said legacy host system.

18. The method of claim 17, further comprising downloading executable code for the applet process to the client system in response to the selection of a uniform resource locator associated with the legacy host system.

19. The method of claim 17, wherein connecting the applet process to the legacy host system is accomplished using a client thread executing under a server.

20. The method of claim 17, wherein communicating between the applet process and the legacy host is accomplished using a data flow based upon a specified communication protocol.

21. The method of claim 17, wherein executing the applet process comprises executing a JAVA applet under a JAVA-capable web browser.

22. The method of claim 17, wherein providing a terminal session comprises providing a 5250 type terminal session.

23. The method of claim 17, wherein said legacy host system is an AS/400 system.

24. The method of claim 17, further comprising the step of encrypting the datastream representing said terminal session at said host system before transmission to said client system.

* * * * *